US005758171A

United States Patent [19]

Ramamurthy et al.

[11] Patent Number: 5,758,171
[45] Date of Patent: May 26, 1998

[54] APPARATUS AND METHOD FOR READING BACK SOCKET POWER STATUS INFORMATION

[75] Inventors: Sriram Ramamurthy, Fremont; Stephen A. Smith, Palo Alto; Jafar Naji, Sunnyvale; Kasturiraman Gopalaswamy, Santa Clara, all of Calif.

[73] Assignee: Cirrus Logic, Inc., Fremont, Calif.

[21] Appl. No.: 498,330

[22] Filed: Jul. 5, 1995

[51] Int. Cl.$^6$ ............................................. G06F 13/10
[52] U.S. Cl. .................................................. 395/750.01
[58] Field of Search ............... 395/750, 750.01–750.08; 364/707

[56] References Cited

U.S. PATENT DOCUMENTS

| 4,841,440 | 6/1989 | Yonezu et al. | 395/750 |
| 5,167,024 | 11/1992 | Smith et al. | 395/375 |
| 5,313,627 | 5/1994 | Amini et al. | 395/575 |
| 5,324,989 | 6/1994 | Thornton | 307/35 |
| 5,390,350 | 2/1995 | Chung et al. | 395/150 |
| 5,396,602 | 3/1995 | Amini et al. | 395/325 |
| 5,404,546 | 4/1995 | Stewart | 395/750 |
| 5,408,668 | 4/1995 | Tornai | 395/750 |
| 5,448,703 | 9/1995 | Amini et al. | 395/290 |
| 5,454,110 | 9/1995 | Kannan et al. | 395/700 |
| 5,481,730 | 1/1996 | Brown et al. | 395/750 |
| 5,504,910 | 4/1996 | Wisor et al. | 395/750 |
| 5,546,590 | 8/1996 | Pierce | 395/750 |
| 5,546,591 | 8/1996 | Wurzburg et al. | 395/750 |
| 5,551,044 | 8/1996 | Shah et al. | 395/750 |
| 5,560,023 | 9/1996 | Crump et al. | 395/750 |

*Primary Examiner*—Jack B. Harvey
*Assistant Examiner*—Paul R. Myers
*Attorney, Agent, or Firm*—Robert P. Bell; J. P. Violette

[57] ABSTRACT

A method and apparatus for monitoring and controlling power to a device such as a PCMCIA/PC card. A PCMCIA/PC card adapter is provided for communicating data and control signals to and from a PCMCIA/PC card and a host processor. The PCMCIA/PC card adapter may communicate with the PCMCIA/PC card to determine the correct voltage (s) for the PCMCIA/PC card. The PCMCIA/PC card may then communicate instruct a power control circuit to provide an appropriate voltage to the PCMCIA/PC card. The power control circuit may be provided with status monitoring registers containing status data reflecting monitored conditions of the PCMCIA/PC card and power supply. A System Management Bus (SMB) may link the power control circuit and the PCMCIA/PC card adapter. If an abnormal status is detected in the PCMCIA/PC card or power supply (e.g., over temperature, over current, thermal shutdown, or the like) the power control circuit, provided with an arbiter and SMB master state machine, may assert control of the SMB and transfer contents of the status registers to corresponding status registers in the PCMCIA/PC card adapter. If abnormal status is detect in the status registers of the PCMCIA/PC card adapter, the PCMCIA/PC card adapter may instruct the power control circuit to shut down power to the PCMCIA/PC card. The PMCIA/PC card adapter may further generate and transmit an interrupt signal to a host processor.

16 Claims, 4 Drawing Sheets

APPARATUS AND METHOD FOR READING BACK SOCKET POWER STATUS INFORMATION

FIELD OF THE INVENTION

The present invention relates to improvements in power controller circuits and peripheral adapters for use in personal computers (PCs). The present invention has particular application for use in power controller circuits and device or host adapters for use with PCMCIA/PC cards in portable computers.

BACKGROUND OF THE INVENTION

A PCMCIA or PC card may provide a mechanism whereby any one of a number of devices may be readily interfaced with a PC such as a laptop or other type of portable computer. Various devices may be incorporated into PCMCIA or PC card, including flash EEPROM, Fax and Modem devices, Network Controllers, Hard Drives, or the like. The PCMCIA standard was developed as a forward compatible standard, to avoid problems associated with previous standards developed for PCs when new technological capabilities outstrip the capacities of existing hardware formats. Thus, for example, the PCMCIA standard may support multiple device voltages, including voltages as yet to be determined for future hardware devices.

A newer standard card, known simply as the PC card, may supplant or augment the PCMCIA standard. The PC standard device card protocol provides backward compatibility with PCMCIA devices. For the purposes of the present application, the term "PCMCIA/PC card" shall refer to a card, interface, or the like conforming to the PCMCIA and/or PC standard or any other standard for use with a device interface.

FIG. 1A illustrates the use of a PCMCIA/PC card in prior art computer system 100. In order to interface PCMCIA/PC card 110 to host processor 120, PCMCIA/PC card adapter 130 may be provided, along with a power control circuit 140. PCMCIA/PC card adapter 130 may provide communication links between host processor 120 of a PC (e.g., laptop computer or the like) and PCMCIA/PC card 110, typically through a number of parallel data and control lines 170 (e.g., 16 lines). PCMCIA/PC card adapter 130 may be interfaced with host processor 120 over a system data and control bus 150, such as a PCI bus or the like.

Power control circuit 140 may be provided to provide appropriate power voltages to PCMCIA/PC card 110, as well as monitor power status of PCMCIA/PC card 110. In computer system 100, PCMCIA/PC card 110 may be removed or inserted into computer system 100 while computer system 100 is powered up (i.e., hot insertion). Power control circuit 140 may be provided with appropriate circuitry to slowly ramp up power to PCMCIA/PC card 110 upon insertion to avoid damaging PCMCIA/PC card 110.

Proper power levels for PCMCIA/PC card 110 may be determined in one of two ways. In some prior art systems, host processor 120 may write voltage control data into control register CR1 137 and CR2 136 in PCMCIA/PC card adapter over system data and control bus 150. PCMCIA/PC card adapter 130 may then transmit voltage control information over serial or parallel interface 180 to power control circuit 140.

In other prior art systems, PCMCIA/PC card adapter 130 may, with permission of host processor 120 (as indicated by a status bit or the like) output a signal through card detect pins CD1 and CD2 and voltage sense pins VS1 and VS2 of parallel data and control lines 170 to PCMCIA/PC card adapter 130. PCMCIA/PC card adapter 130 may then store voltage control information in control registers CR1 137 and CR2 136 (e.g., one register each for a dual card controller) and may communicate such voltage control information to host processor 120 through system data and control bus 150. Host processor 120 may in turn set bits in PCMCIA/PC card adapter 130 to indicated desired voltages for PCMCIA/PC card 110.

PCMCIA/PC card adapter 130 may in turn drive signals over serial or parallel interface 180 to power control circuit 140 to select and switch voltages to PCMCIA/PC card 110. Voltages supplied to PCMCIA/PC card 110 may include system voltage Vcc for operating PCMCIA/PC card 110 and programming voltage Vpp which may be used, for example to program a flash EEPROM or the like. Serial or parallel interface 180 may comprise a number of serial or parallel control lines for controlling power control circuit 140 to select voltage levels for supply and programming voltages.

PCMCIA/PC card adapter 130 may output signals to power control over serial or parallel interface 180 circuit 140 to select one of a number of control voltages for PCMCIA/PC card 110. Power control circuit 140 may monitor voltages to PCMCIA/PC card 110 and output status signals indicating that power control circuit 140 and PCMCIA/PC card 110 are functioning normally (e.g., a_pwr_good and b_pwr_good for a two socket device). Status signal over_current from power control circuit 140 may indicate whether an over current (e.g., greater than 1.0 Amp at 3.3 Volts) condition exists. Status signal over-temperature from power control circuit 140 may indicate whether an over temperature condition has occurred in power control circuit 140. Such an over temperature condition may indicate failure of power control circuit 140 or an over current condition within power control circuit 140.

In addition, power control circuit 140 may be provided with a thermal shut-down mechanism to shut down power to PCMCIA/PC card 110 in the event of an over temperature condition. In the event of such a condition, power to PCMCIA/PC card 110 may be shut off and remain off, even if temperature subsequently drops. A status signal may be output indicating that a thermal shutdown condition has occurred. Otherwise, PCMCIA/PC card adapter could continue sending data to PCMCIA/PC card 110, even after a thermal shutdown has occurred and valuable data may be lost.

All of the status signals from power control circuit 140 may be output as separate pins outputs from power control circuit 140. Due to pin count limitations, some PCMCIA/PC card adapters 130 may not sense some or all of these status signals, as illustrated in FIG. 1A.

An over temperature condition may be hazardous and/or damage circuitry in a laptop or other type of portable computer using nickel hydride batteries or the like. If a PCMCIA/PC card, such as a hard drive, begins to fail (e.g., short or low impedance condition) a corresponding increase in current may be detected. Thus, if an over temperature or over current condition exists, it may be advisable to shut down power to PCMCIA/PC card 110 before damage occurs to either the host computer of PCMCIA/PC card 110.

Other voltage conditions less hazardous to the host computer or PCMCIA/PC card 110 may also be detected by power control circuit 140. For example, low voltage, over voltage or transient voltage conditions may also be detected and appropriate status messages generated.

In the prior art device of FIG. 1A, power control circuit 140 may be provided with an interface to interrupt controller 160 to generate an interrupt signal when an over current, over voltage, or other condition occurs. Interrupt controller 160 may output a signal to host processor 120 to interrupt normal processing. However, in the apparatus of FIG. 1A, host computer 120 cannot determine what condition has caused the interrupt.

FIG. 1B illustrates a prior art apparatus which attempts to overcome the limitations of the apparatus of FIG. 1A. In FIG. 1B, glue logic 190 may be provided to capture status signals output from power control circuit 140 and pass such signals through system data and control bus 150 to host processor 120. In response to those status messages, host processor 120 may send a signal to PCMCIA/PC card adapter 130 instructing power control circuit 140 to shut down power to PCMCIA/PC card 110 to prevent damage to PCMCIA/PC card or the host processor. The use of glue logic 190, however, increases the overall cost and complexity of the computer system and increases the amount of circuitry on the motherboard of the host computer system.

There are some common disadvantages to used the design of FIGS. 1A and 1B. In battery powered computers such as laptops, as well as computers using energy saving features, host processor 120 may be powered down into a stasis mode after a preprogrammed period of inactivity. Meanwhile, PCMCIA/PC card 110 may be configured to receive data and "wake" host processor 120 when data is received. For example, a network interface card, fax card, or modem card may be configured to receive data (e.g., receive fax over phone line) and then "wake" host processor 120 to receive and process the data (e.g., download or print the fax data).

In such a scenario, the device protection scheme of power control circuit 140 may not function properly. Power control circuit 140 may not be provided with sufficient circuitry to "wake" host processor 120 in the event of an over temperature or over current condition. Thus, if host processor 120 is in a powered down or stasis condition, an over temperature or over current condition may remain unchecked, resulting in circuit failure or damage within PCMCIA/PC card 110 or computer system 100.

In prior art devices, serial or parallel interface 180 may comprise a parallel interface for transmitting voltage selection commands from PCMCIA/PC card adapter 130 to power control circuit 140. As noted above, due to pin limitations, such devices may not sense some or all status signals (over current, over temperature, or the like) from power control circuit 140.

Several serial interfaces have been tried as serial or parallel interface 180 in prior art systems. In some systems, a simple serial interface may be used to transmit only voltage control information from PCMCIA/PC card adapter 130 to power control circuit 140. Other systems may employ a standardized simplified serial control bus such as the Intel® System Management Bus (SMB).

FIG. 2 illustrates computer system 200 with PCMCIA/PC card interface using SMB 280 to communicate between PCMCIA/PC card adapter and power control circuit 140. The SMB is a bus design protocol intended for control of system devices, and is generally not capable of or designed for high data rates. The SMB may be a two, three or four wire bi-directional interface which, when applied to the apparatus of FIG. 1A, may be used for both socket power control and read back of status information.

As illustrated in FIG. 2, prior art power control circuit 140 may be provided with SMB slave machine 141, power control register CR1 142 and CR2 143, and status information registers SR1 144 and SR2 145. PCMCIA/PC card adapter 130 may be provided with SMB master machine 131 to write control data over SMB 280 to control registers CR1 142 and CR2 143.

SMB 280 may be local between PCMCIA/PC card adapter 130 and power control circuit 140. If multiple masters reside on SMB 280, and if power to PCMCIA/PC card 110 is to be shut down, SMB master 131 in PCMCIA/PC card adapter 130 may need to arbitrate for SMB 280. The latency required to get SMB 280 by PCMCIA/PC card adapter 130 may be unpredictable, which could be potentially harmful to PCMCIA/PC card 110. For example, PCMCIA/PC card 110 operating at 5 Volts may be removed from the host computer and a different PCMCIA/PC card 110 operating at 3.3 Volts may be inserted. In such a situation, PCMCIA/PC card adapter 130 needs to shut down the 5 Volt power supply before a 3 Volt PCMCIA/PC card 110 is inserted to avoid damage to PCMCIA/PC card 110.

Power control circuit 140 may provide an interrupt pin 161 to output an interrupt signal indicating any abnormal status such as thermal shutdown, over current, or the like. Interrupt pin 161 may be tied to interrupt controller 160 and host processor 120 which in turn may control power through PCMCIA/PC card adapter 130. PCMCIA/PC card adapter 130 may not be able to pass on an interrupt signal from power control circuit 140 to host processor 120 due to the limited number of pins available on PCMCIA/PC card adapter 130.

The prior art systems of FIGS. 1 and 2 may be limited in that they may require an additional pin or pins (e.g., interrupt pin) to support status information feadback. In addition, it is a centralized control scheme involving an information loop including power control circuit 140, interrupt controller 160, host processor 120, and PCMCIA/PC card adapter 130. The latency of this loop may be somewhat high, especially if host processor 120 is in a stasis or powered-down mode.

Thus, it remains a requirement in the art to provide a PCMCIA/PC card interface capable of monitoring power and temperature status and responding quickly to indicated abnormalities in power or temperature. Furthermore, it remains a. requirement in the art to perform such functions without significantly increasing pin count or system hardware.

SUMMARY AND OBJECTS OF THE INVENTION

A system for controlling and monitoring power to a device includes a power control circuit which provides a voltage supply to the device and monitors a condition of the device. An interface circuit, coupled to the device, a host processor, and the power control circuit, transmits and receives data and control signals to and from the device and the host processor. The interface circuit receives, from the power control circuit, status data indicating the condition of the device and transmits, in response to received status data, a signal to the power control circuit to control the voltage supply to the device.

The interface circuit determines, in response to the data and control signals, an appropriate supply voltage the device and transmits to the power control circuit, a signal indicating the appropriate supply voltage. A bus couples the power control circuit to the interface circuit and transmits to the power control circuit, a signal indicating the appropriate supply voltage. The bus receives, from the power control circuit, status data indicating the condition of the device.

A bus slave state machine in the power control circuit operates the power control circuit as a slave on the bus. A bus master state machine in the power control circuit operates the power control circuit as a bus master. An arbiter in the power control circuit, arbitrates bus master control with the interface, circuit control of the bus.

A bus slave state machine in the interface circuit operates the interface circuit as a slave on the bus. A bus master state machine in the interface circuit operates the interface circuit as a bus master. An arbiter in the interface circuit arbitrates bus master control with the power control circuit control of the bus.

The power control circuit includes a status register storing status information of the device and a control register storing voltage control information of the device. The interface circuit includes a status register storing status information of the device.

The interface circuit includes an interrupt generator which generates and transmits an interrupt signal to the host processor when status information stored in the status register in the interface circuit indicates an abnormal condition in the device. The bus may be a local system management bus.

It is an object, therefore, of the present invention to provide a PCMCIA/PC card system interface which monitors power status and responds quickly to indicated abnormalities in temperature.

It is a further object of the present invention to provide a PCMCIA/PC card system interface which monitors temperature status and responds quickly to indicated abnormalities in temperature.

BRIEF DESCRIPTIONS OF THE DRAWINGS

DETAILED DESCRIPTION OF THE INVENTION

Figure 1A:
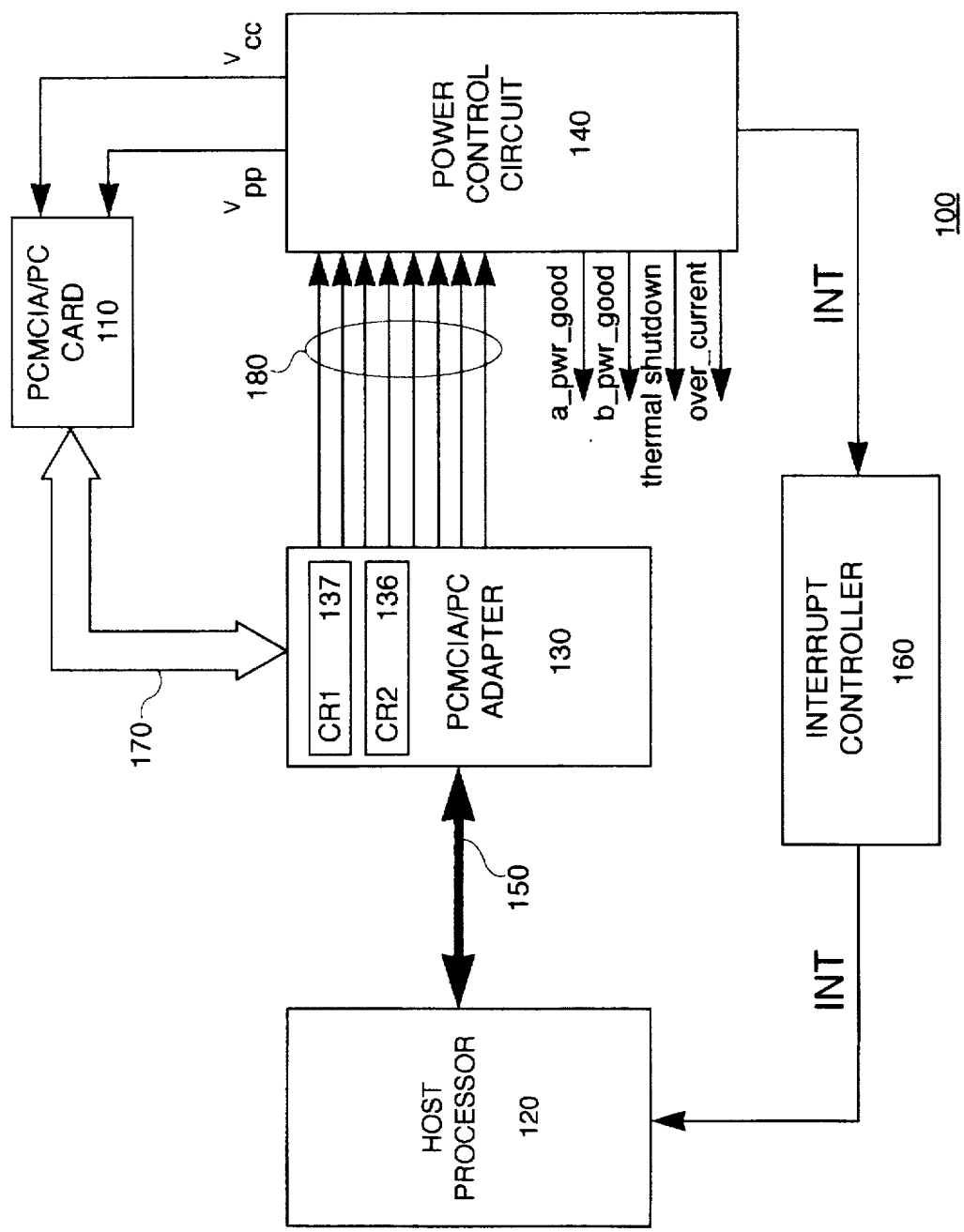
FIG. 1A is a block diagram of a prior art PC with a PCMCIA/PC card interface.
Figure 1B:
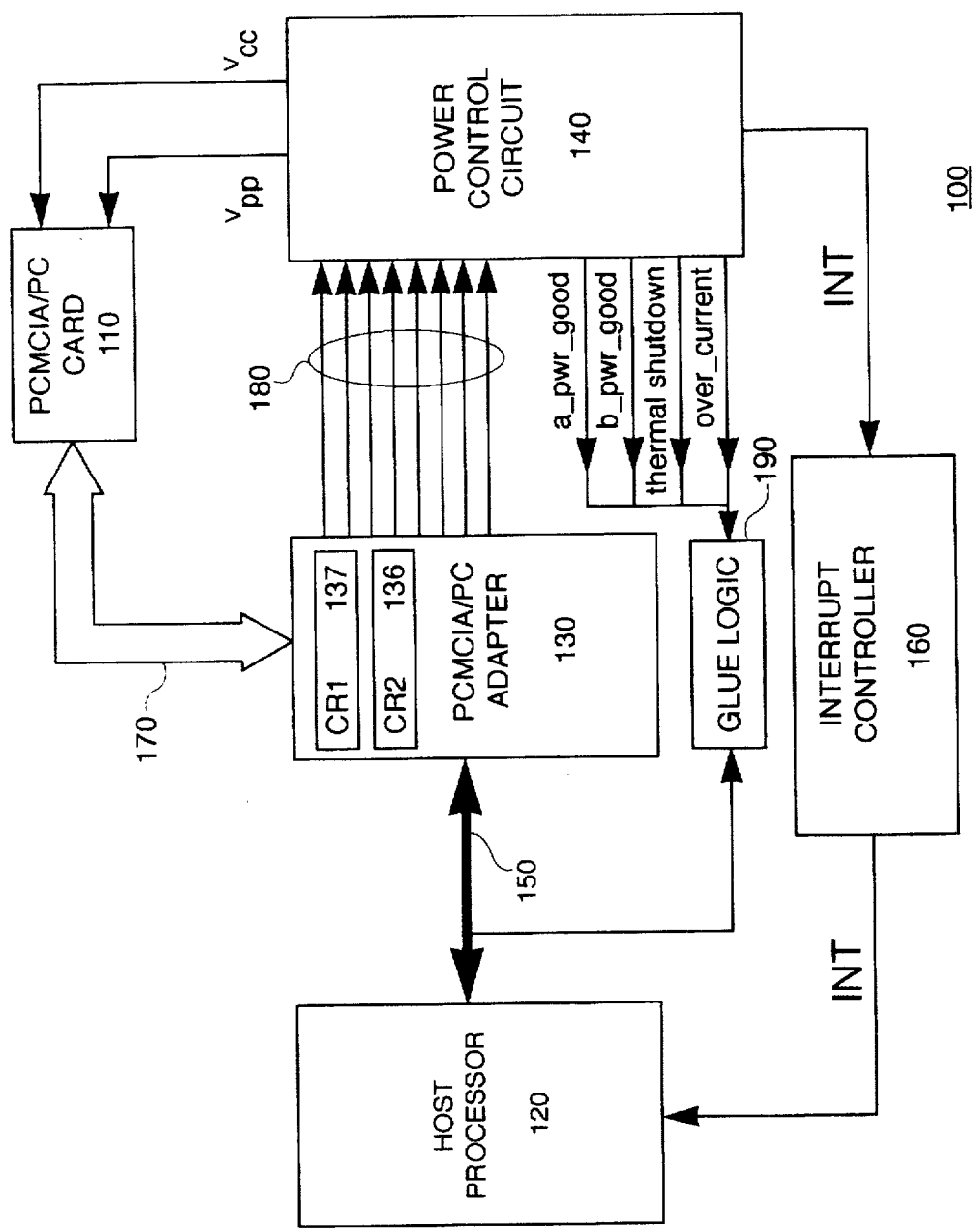
FIG. 1B is a block diagram of a prior art PC with a PCMCIA/PC card interface using glue logic to transfer status data to a host processor.
Figure 2:
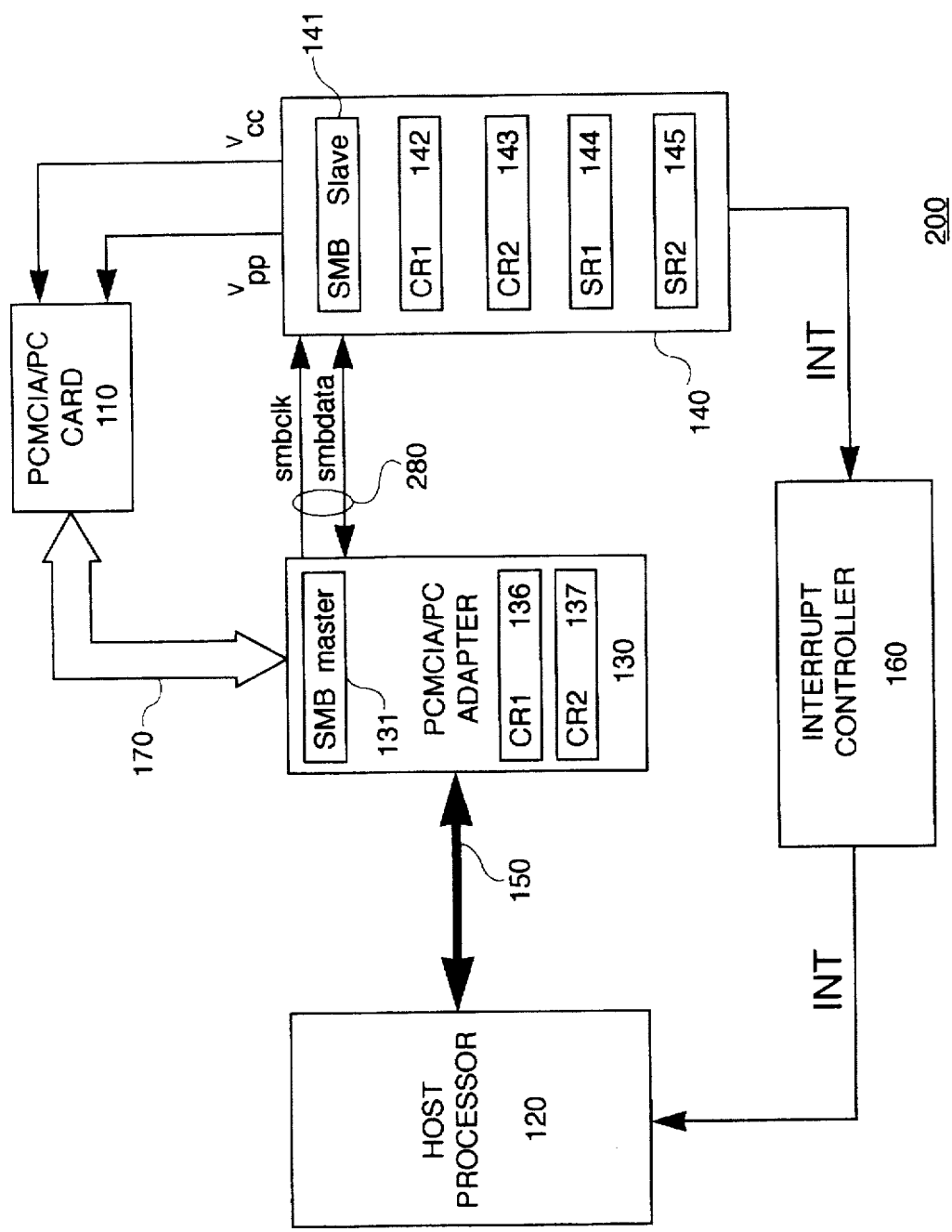
FIG. 2 is a block diagram of a prior art PC with a PCMCIA/PC card interface.
Figure 3:
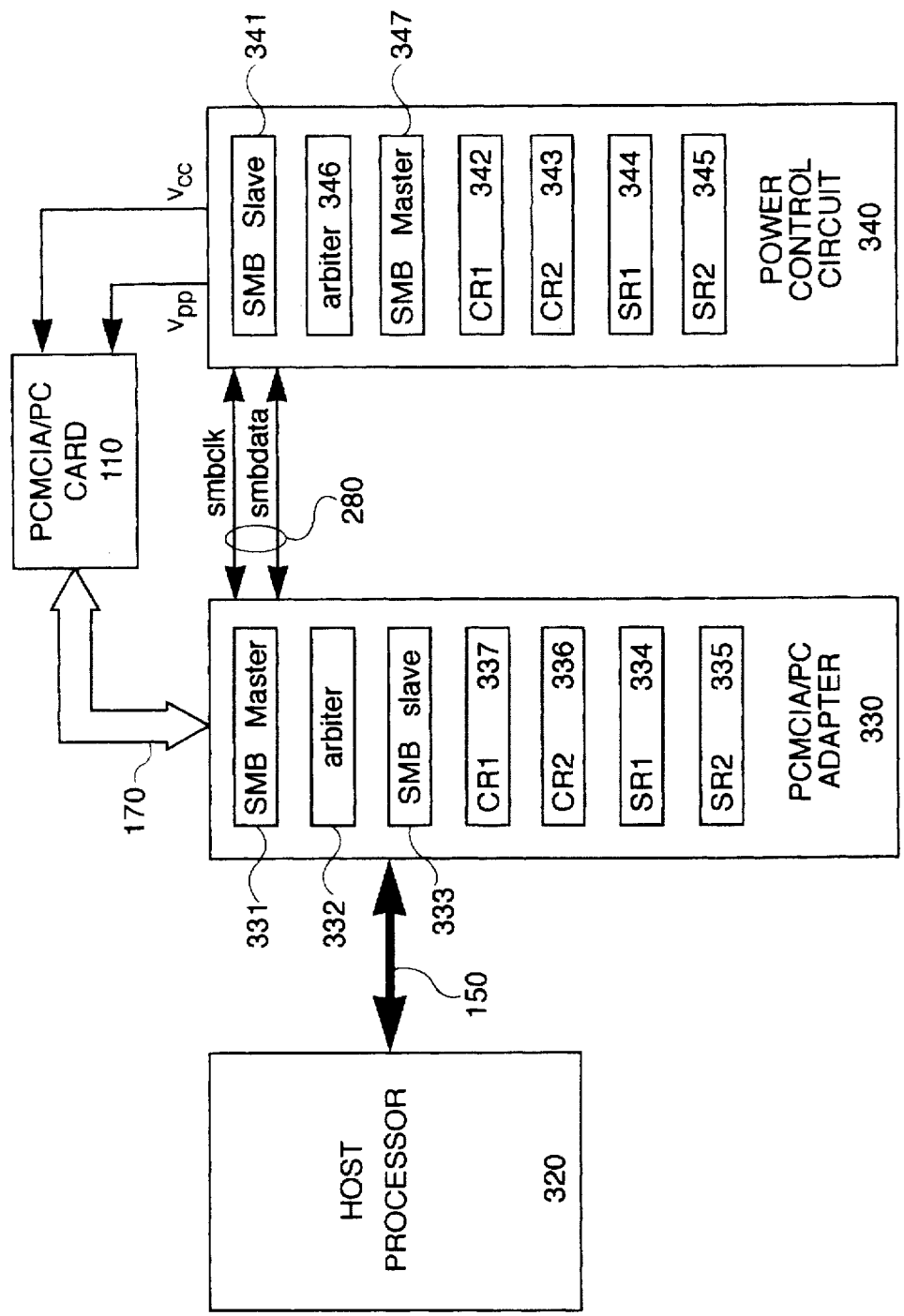
FIG. 3 is a block diagram of a PC incorporating the apparatus and method of the present invention.

Referring now to FIG. 3, PCMCIA/PC card adapter 330 may be able to detect what type of PCMCIA/PC card 110 is coupled to the computer system 300. As PCMCIA/PC card adapter 330 controls power control circuit 340, status information from status registers SR1 344 and SR2 345 of power control circuit 340 may be passed to PCMCIA/PC card adapter 330 over SMB 280, asynchronously with regard to overall system clock cycles. PCMCIA/PC card adapter 330 may accordingly pass such status information to host. processor 320 through a management interrupt on system data and control bus 150.

In addition, PCMCIA/PC card adapter 330 may be provided with internal logic to take corrective measures to control power control circuit 340 to shut off power to PCMCIA/PC card 110. Thus, if host processor 320 is in a stasis or power down mode, power may be quickly shut down to PCMCIA/PC card 110 in the event of an over current or over temperature condition before damage to PCMCIA/PC card 110 or other circuitry of computer system 300 occurs.

PCMCIA/PC card adapter 330 may be provided with both SMB master machine 331 and SMB slave machine 333, as well as two additional status registers SR1 334 and SR2 335 for storing status information received from power control circuit 340. Host adapter 330 may generate an interrupt signal over system data and control bus 150 (e.g., PCI bus). SMB master and slave machines (state machines), as well as other SMB hardware may be constructed, as is known in the art, according to Intel® *System Management Bus Specification*, revision 0.95, incorporated herein by reference.

In addition, power control circuit 340 may be provided with a SMB master machine 347 in addition to SMB slave machine 341, control registers CR1 342 and CR2 343, and status registers SR1 344 and SR2 345. Both PCMCIA/PC card adapter 330 and power control circuit 340 are provided with SMB arbiters 332 and 346, respectively, to arbitrate control (i.e., bus mastering) according to the SMB specification.

Since SMB 280 is local between PCMCIA/PC card adapter 330 and power control circuit 340, in the event of an abnormal condition (e.g., over current or over temperature) SMB master 347 in power control circuit 340 may arbitrate, through arbiter 346, for control of SMB 280. Once SMB master 347 has control of SMB 280, status information from status registers SR1 344 and SR2 345 may be sent over SMB 280 to status registers SR1 334 and SR2 335 in PCMCIA/PC card adapter 330.

Status information may be transmitted as four bytes (e.g., two bytes for each 8-bit status register SR1 344 and SR2 345, where one byte represent an address for the status register and one byte represents status data for that register) in roughly 50 smbclk cycles. SMB 280 is a synchronous bus with an internal data clock smbclk. Note, however, SMB 280 may be asynchronous with regard to clock cycles on system data and control bus 150. Thus, status information may be transferred from power control circuit 340 to PCMCIA/PC card adapter 330 without interrupting or requiring data cycles on system data and control bus 150.

Once status information is stored in status registers SR1 334 and SR2 335 in PCMCIA/PC card adapter 330, PCMCIA/PC card adapter may generate an interrupt on system data and control bus 150, whether or not an interrupt is generated may depend upon the nature of the status information. If status information indicates an abnormal condition (e.g., over current, over temperature, or thermal shutdown) an interrupt may be generated. If status information indicates normal conditions (e.g., power OK) an interrupt may not be generated. In either case, host processor 320 may read status information from PCMCIA/PC card adapter 330 over system data and control bus 150.

As discussed above, the apparatus and method of the present invention provide several advantages over the prior art systems. No additional pins may be necessary on either PCMCIA/PC card adapter 330 or power control circuit 340 to implement the method and apparatus of the present invention. In addition, power control circuit 340 may asynchronously inform PCMCIA/PC card adapter 330 of abnormal events (e.g., over current or over power). In a worst case scenario, if PCMCIA/PC card adapter 330 is in the process of transferring data to power control circuit 340 over SMB 280 (e.g., 4 bytes of data at about 50 smbclk cycles) power control circuit 340 may have to wait for the transfer to finish, arbitrate for control of SMB 280 and then transfer status information.

In case of catastrophic events, PCMCIA/PC card adapter 330 may decide locally to shut down power to PCMCIA/PC card 110, if necessary, to prevent damage to components and conserve battery power. In a portable computer environment (e.g., portable, laptop, notebook, palmtop, or the like) conservation of battery power may be essential.

While the preferred embodiment and various alternative embodiments of the invention have been disclosed and described in detail herein, it may be apparent to those skilled in the art that various changes in form and detail may be made therein without departing from the spirit and scope thereof.

For example, while discussed herein as being used for a PCMCIA/PC type card, the apparatus and method of the present invention may be implemented in other types of systems where it is desirable to communicate status information between a power control circuit and an interface device.

What is claimed is:

1. A computer system for controlling and monitoring power and temperature status and rapidly responding to indicated abnormalities in power or temperature of at least one externally removable card, comprising:

a power control circuit, coupled to the at least one externally removable card, for providing at least one voltage supply to the at least one externally removable card and for monitoring at least one condition of the power control circuit; and an interface circuit, coupled to the at least one externally removable card by a set of parallel data and control lines, a host processor by a system data and control bus, and the power control circuit by a system management bus, for transmitting and receiving data and control signals to and from the at least one externally removable card and the host processor, and for receiving, from the power control circuit, status data indicating the at least one condition of the power control circuit and transmitting, in response to received status data, a signal to the power control circuit for controlling the at least one voltage supply to the at least one externally removable card, each of which transmitting and receiving is performed by the respectively coupling bus or lines.

2. The system of claim 1, wherein said interface circuit, determines, in response to the data and control signals, an appropriate supply voltage for the at least one device and transmits to the power control circuit, a signal indicating the appropriate supply voltage.

3. The system of claim 2, wherein said system management bus coupling the power control circuit to the interface circuit carries signals for transmitting to the power control circuit an indication of the appropriate supply voltage, and signals for receiving from the power control circuit status indication on of the at least one condition of the power control circuit.

4. The system of claim 3, wherein said power control circuit further comprises:

a bus slave state machine for operating the power control circuit as a slave on the bus;

a bus master state machine for operating the power control circuit as a bus master; and an arbiter, for arbitrating bus master control with the interface circuit for control of the bus.

5. The system of claim 4, wherein said interface circuit further comprises:

a bus slave state machine for operating the interface circuit as a slave on the bus;

a bus master state machine for operating the interface circuit as a bus master; and an arbiter, for arbitrating bus master control with the power control circuit for control of the bus.

6. The system of claim 5, wherein said power control circuit further comprises:

at least one status register for storing status information for the power control circuit; and at least one control register for storing voltage control information for the at least one device.

7. The system of claim 6, wherein said interface circuit further comprises:

at least one status register for storing status information for the power control circuit; and at least one control register for storing voltage control information for the at least one device.

8. The system of claim 7, wherein said interface circuit further comprises:

interrupt generating means, for generating and transmitting an interrupt signal to the host processor when status information stored in the at least one status register in said interface circuit indicates an abnormal condition in the power control circuit.

9. A method for controlling and monitoring power and temperature status and rapidly responding to indicated abnormalities in power or temperature of at least one externally removable card, comprising the steps of:

providing, with a power control circuit, at least one voltage supply to at least one externally removable card, monitoring, with the power control circuit, at least one condition of the power control circuit, receiving by an interface circuit, from the power control circuit, status data indicating the at least one condition of the power control circuit by a system management bus electrically coupling the interface circuit with the power control circuit, and transmitting by the interface circuit, in response to received status data, a signal to the power control circuit by the system management bus for controlling the at least one voltage supply to the at least one externally removable card.

10. The method of claim 9, further comprising the steps of:

determining, in the interface circuit, in response to the data and control signals, an appropriate supply voltage for the at least one externally removable card, and transmitting to the power control circuit, a signal indicating the appropriate supply voltage by the system management bus.

11. The method of claim 10, further comprising the step of receiving, from the power control circuit, status data indicating the at least one condition of the power control circuit by the system management bus.

12. The method of claim 11, further comprising the step of arbitrating bus master control with the interface circuit for control of the bus.

13. The method of claim 12, further comprising the step of arbitrating bus master control with the power control circuit for control of the bus.

14. The method of claim 13, further comprising the steps of:

storing status information for the power control circuit in at least one status register in the power control circuit; and storing voltage control information in at least one control register in the power control circuit.

15. The method of claim 14, further comprising the step of storing status information for the power control circuit in at least one status register in the interface circuit.

16. The method of claim 15, further comprising the step of generating and transmitting an interrupt signal to a host processor when status information stored in the at least one status register in the interface circuit indicates an abnormal condition of the power control circuit.

* * * * *